April 28, 1959  R. J. McGAVOCK  2,883,877
SAFETY ATTACHMENTS FOR STEERING WHEELS
Filed April 18, 1956
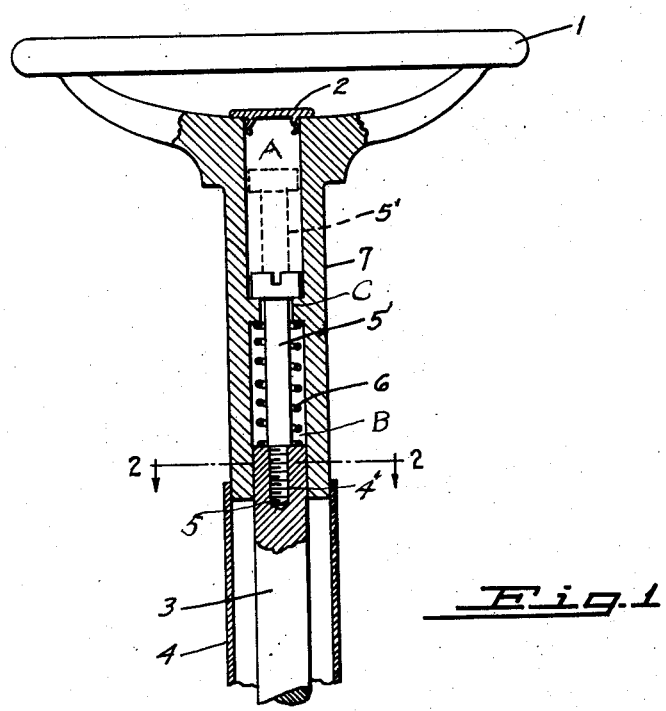
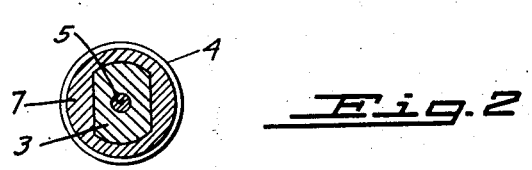
INVENTOR.
Robert J. McGavock
BY Edward C. Healy
ATTORNEY

United States Patent Office 2,883,877
Patented Apr. 28, 1959

2,883,877

SAFETY ATTACHMENTS FOR STEERING WHEELS

Robert J. McGavock, Birmingham, Ala.

Application April 18, 1956, Serial No. 579,059

2 Claims. (Cl. 74—493)

This invention relates to safety devices for motor vehicles and has particular reference to a device associated with the steering wheel and steering column of the motor vehicle.

The principal object of the invention is the provision of safety means for automatically absorbing the shock of sudden impact of the chest or body of the driver of the vehicle with the steering wheel when an accident or collision occurs.

An additional object of the invention is to provide a structure that will remain inoperative during the period in which the steering wheel is manually gripped by the operator, and which will instantly and effectively function when body pressure is applied to the steering wheel.

A further object of the invention is the employment of spring means within the steering wheel column, which spring when compressed, cushions the impact.

A further object of the invention is the production of a safety device of the character described that is simple in construction, economical to manufacture, strong, durable, and highly efficient and serviceable in use.

Other objects and advantages will be apparent during the course of the following description.

In the accompanying drawing forming a part of this specification and in which like numerals are employed to designate like parts throughout the same, Fig. 1 is a view partly in elevation and partly in section and disclosing the features of construction of my invention, and Fig. 2 is a horizontal sectional view, the view being taken on the line 2—2 of Fig. 1, and looking in the direction of the arrows.

In the accompanying drawing wherein for the purpose of illustration is shown a preferred embodiment of my invention, the numeral 1 designates the steering wheel of an automobile that is equipped with a cover plate or horn button 2, while the numeral 3 designates the steering shaft of the vehicle which shaft is encompassed by a housing 4. The said shaft is equipped at its upper end with an internally threaded bore 4' adapted to receive therein an externally threaded extension 5 of a headed bolt 5'. A heavy compression spring 6 of the coil type encircles the bolt. The purpose of the spring will be hereinafter explained.

As disclosed to advantage in Fig. 1 of the drawing the numeral 7 designates a tubular steering wheel column. This column is divided into an upper compartment A, and a lower compartment B by an inner annular apertured flange C. The said flange provides upper shoulders on which the head of the bolt normally rests and also provides lower shoulders adapted to be engaged by the upper end of the spring 6 to provide a seat therefor. The top of the shaft 3 is adapted to be engaged by the lower extremity of the spring, thus providing a seat for the spring. It will be noted that the upper end of the steering shaft is swaged, as illustrated in Fig. 2. The shaft 3 and the column 7 will rotate simultaneously as the steering wheel is turned. This swaging arrangement will eliminate any rotation of the column 7 independently of the shaft 3.

In operation when body pressure is applied to the steering wheel, the steering column 7 will move downwardly within the confines of the housing 4. This downward movement will cause the spring to retract and the bolt will move to the dotted line position indicated in the compartment A.

It is obvious that the contraction of the spring and the downward sliding movement of the column 7 in the housing 4 together with the upward movement of the bolt, will effectively cushion the shock of impact and will reduce to a minimum any possibility of injury to the chest or body of the driver.

It is to be understood that the form of my invention herewith shown and described is to be taken as a preferred example of the same and that various changes relative to the shape, size, material, and arrangement of parts may be readily resorted to without departing from the spirit of the invention or the scope of the subjoined claims.

Having thus described my invention, I claim:

1. In a steering wheel assembly, a tubular steering wheel column for supporting the wheel, said column being equipped with an apertured internal flange dividing the column into an upper compartment and a lower compartment, a steering shaft, a fixed tubular housing spaced from and surrounding said shaft, a headed bolt connected at its lower end to said shaft for normally supporting said column in an elevated position, and a compression spring mounted in the lower compartment of said column and encircling said bolt and adapted to cushion the shock of body impact as the column moves downwardly in said housing under the force of the impact, the said bolt capable of relative reciprocatory movement in the upper compartment of said column.

2. The structure as defined in claim 1 and wherein the upper surface of the flange supports the head of the bolt and the lower surface of the flange and the top of the steering shaft serve, respectively, as seats for the top and bottom of said compression spring.

References Cited in the file of this patent

UNITED STATES PATENTS

| 1,367,695 | Gray | Feb. 8, 1921 |

FOREIGN PATENTS

| 1,088,807 | France | Sept. 15, 1954 |
| 374,908 | Italy | Sept. 15, 1939 |